United States Patent
Kondo et al.

(10) Patent No.: US 11,594,762 B2
(45) Date of Patent: Feb. 28, 2023

(54) ALL SOLID STORAGE ELEMENT LAMINATE AND BATTERY

(71) Applicant: Murata Manufacturing Co., Ltd., Nagaokakyo (JP)

(72) Inventors: Masahiko Kondo, Nagaokakyo (JP); Makoto Yoshioka, Nagaokakyo (JP)

(73) Assignee: MURATA MANUFACTURING CO., LTD., Nagaokakyo (JP)

(*) Notice: Subject to any disclaimer, the term of this patent is extended or adjusted under 35 U.S.C. 154(b) by 582 days.

(21) Appl. No.: 16/535,301

(22) Filed: Aug. 8, 2019

(65) Prior Publication Data

US 2019/0363400 A1 Nov. 28, 2019

Related U.S. Application Data

(63) Continuation of application No. PCT/JP2017/044554, filed on Dec. 12, 2017.

(30) Foreign Application Priority Data

Feb. 23, 2017 (JP) .............................. JP2017-031849

(51) Int. Cl.
*H01M 10/0585* (2010.01)
*H01M 10/04* (2006.01)
*H01M 50/24* (2021.01)

(52) U.S. Cl.
CPC ... *H01M 10/0585* (2013.01); *H01M 10/0422* (2013.01); *H01M 50/24* (2021.01)

(58) Field of Classification Search
CPC ...................... H01M 10/0585; H01M 10/0422
See application file for complete search history.

(56) References Cited

U.S. PATENT DOCUMENTS

| | | | |
|---|---|---|---|
| 4,707,420 A | 11/1987 | Wedlake | |
| 10,079,403 B2 | 9/2018 | Grady et al. | |
| 2004/0048149 A1* | 3/2004 | Gross | H01M 50/116 429/127 |
| 2011/0183183 A1 | 7/2011 | Grady et al. | |
| 2016/0015987 A1* | 1/2016 | Perraud | H01L 31/043 607/61 |
| 2016/0315346 A1* | 10/2016 | Sasaki | H01M 10/0585 |
| 2019/0088979 A1 | 3/2019 | Grady et al. | |

FOREIGN PATENT DOCUMENTS

| | | |
|---|---|---|
| JP | S59177869 A | 10/1984 |
| JP | 2008053125 A | 3/2008 |
| JP | 2012234670 A | 11/2012 |
| JP | 2013518394 A | 5/2013 |
| JP | 2015220101 A | 12/2015 |
| JP | 2016001600 A | 1/2016 |
| WO | 2012020699 A1 | 2/2012 |

OTHER PUBLICATIONS

International Search Report Issued in PCT/JP2017/044554, dated Mar. 20, 2018.
Written Opinion of the International Searching Authority issued in PCT/JP2017/044554, dated Mar. 20, 2018.

* cited by examiner

*Primary Examiner* — Tae-Sik Kang
(74) *Attorney, Agent, or Firm* — ArentFox Schiff LLP

(57) ABSTRACT

An all solid storage element laminate that has a plurality of all solid storage elements disposed in a matrix, and includes a plurality of element layers laminated in a thickness direction. The all solid storage elements of element layers adjacent to each other in a thickness direction are electrically connected to each other.

15 Claims, 10 Drawing Sheets

ALL SOLID STORAGE ELEMENT LAMINATE AND BATTERY

CROSS REFERENCE TO RELATED APPLICATIONS

The present application is a continuation of International application No. PCT/JP2017/044554, filed Dec. 12, 2017, which claims priority to Japanese Patent Application No. 2017-031849, filed Feb. 23, 2017, the entire contents of each of which are incorporated herein by reference.

FIELD OF THE INVENTION

The present invention relates to an all solid storage element laminate and a battery including the all solid storage element laminate.

BACKGROUND OF THE INVENTION

Conventionally, batteries such as secondary batteries are often used as electric storage devices. Known examples of batteries include a battery produced using an electrolytic solution such as a lithium ion secondary battery and an all solid battery produced using a solid electrolyte (see, for example, Patent Document 1).

Patent Document 1: PCT International Publication No. 2012-020699

SUMMARY OF THE INVENTION

Unfortunately, when an impact or vibration is applied, the all solid battery may be broken by the formation of a crack or the like. Therefore, there is a need to improve the reliability of the all solid battery.

A main object of the present invention is to improve the reliability of an all solid battery (all solid storage element).

The all solid storage element laminate according to the present invention includes a plurality of element layers. Each of the element layers has a plurality of all solid storage elements disposed in a matrix. The plurality of element layers are laminated in a thickness direction. A first plurality of all solid storage elements of a first element layer of the plurality of element layers are electrically connected to a second plurality of all solid storage elements of a second element layer of the plurality of element layers, the first element layer and the second element layer being adjacent to each other in the thickness direction. Thus, the all solid storage elements adjacent to each other in the laminating direction are electrically connected via a plurality of conductive paths. Accordingly, for example, in the case where a crack or the like is generated in the all solid storage elements due to an impact or vibration applied to the all solid storage element laminate, and one of the conductive paths between the all solid storage elements adjacent to each other in the laminating direction is cut, as long as the other conductive paths between the all solid storage elements adjacent to each other in the laminating direction is connected, there is no complete insulation between the all solid storage elements. Therefore, the all solid storage element laminate according to the present invention has excellent reliability.

In the all solid storage element laminate according to the present invention, it is preferable that each of the all solid storage elements has a rectangular parallelepiped shape in which at least one of the ridge line portion or the corner portion has a chamfered shape or a rounded shape.

In the all solid storage element laminate according to the present invention, it is preferable that each of the all solid storage elements has a rectangular parallelepiped shape with a longest side of 1 mm or less.

In the all solid storage element laminate according to the present invention, each of the all solid storage elements may have a rectangular parallelepiped shape. In that case, all solid storage elements of the first element layer are disposed such that a longitudinal direction of the all solid storage elements faces a first direction, while the all solid storage elements of the second element layer are disposed such that a longitudinal direction thereof faces a second direction different from the first direction. Further, when viewed in a planar view, the plurality of all solid storage elements may be disposed such that all solid storage elements of the first element layer overlaps with four all solid storage elements of the second element layer and are adjacent to one another at corner portions thereof.

In the all solid storage element laminate according to the present invention, a planar view shape of each of the all solid storage elements may be polygonal.

A battery according to the present invention includes the all solid storage element laminate according to the present invention and an exterior body. The all solid storage element laminate is housed in the exterior body. As described above, the all solid storage element laminate according to the present invention has excellent reliability. Therefore, the battery according to the present invention also has excellent reliability.

In the battery according to the present invention, the inside of the exterior body is preferably filled with a resin.

According to the present invention, it is possible to improve the reliability of a battery produced using an all solid battery (all solid storage element).

DETAILED DESCRIPTION OF THE INVENTION

Figure 1:
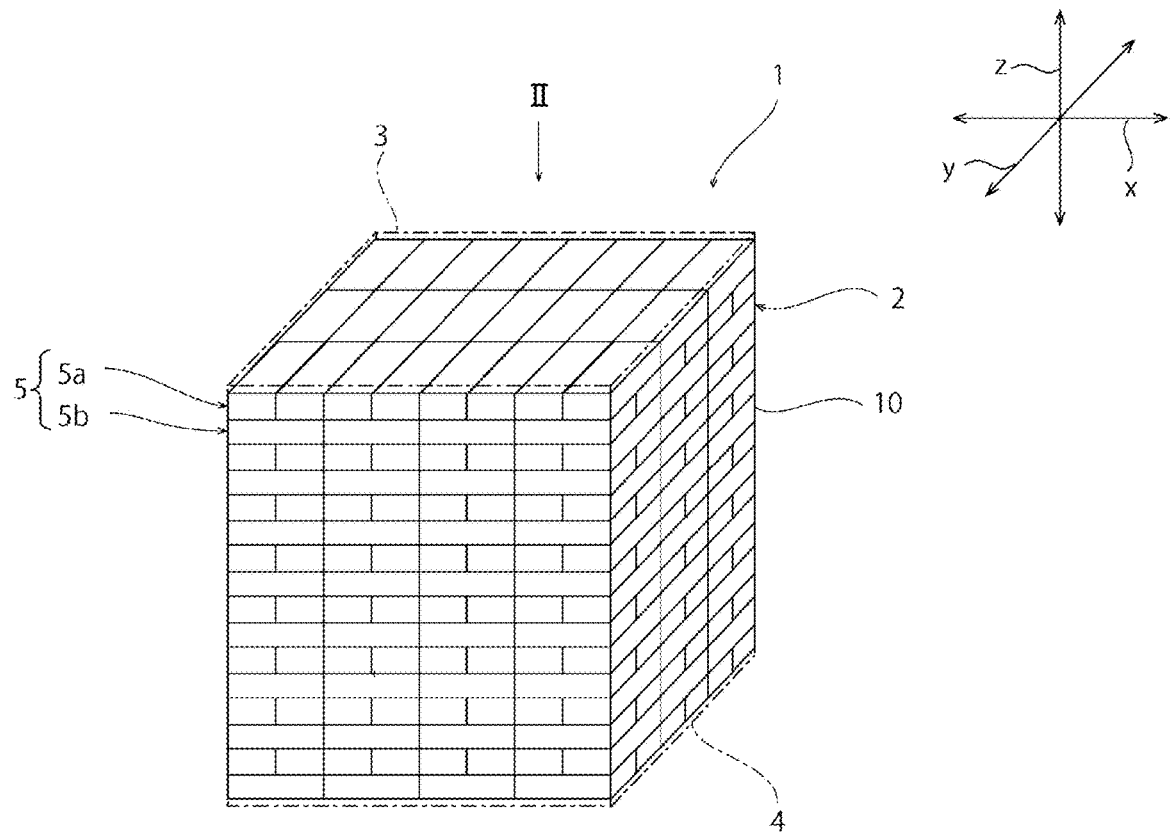
FIG. 1 is a schematic perspective view of an all solid storage element laminate according to a first embodiment.
Figure 1:
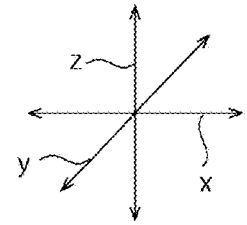

Hereinafter, an example of preferred embodiments of the present invention will be described. However, the following embodiments are merely examples. The present invention is not limited to the following embodiments at all.

Further, members having substantially the same functions are referred to by the same reference numerals in each of the drawings referred in this embodiment and the like. The drawings referred to in the embodiments and the like are schematically described. The dimensional ratios of objects drawn in the drawing may differ from the dimensional ratios of real objects. The dimensional ratios of objects, and the like may differ between the drawings. The specific dimensional ratios of objects, and the like should be determined in consideration of the following description.

First Embodiment

Figure 2:
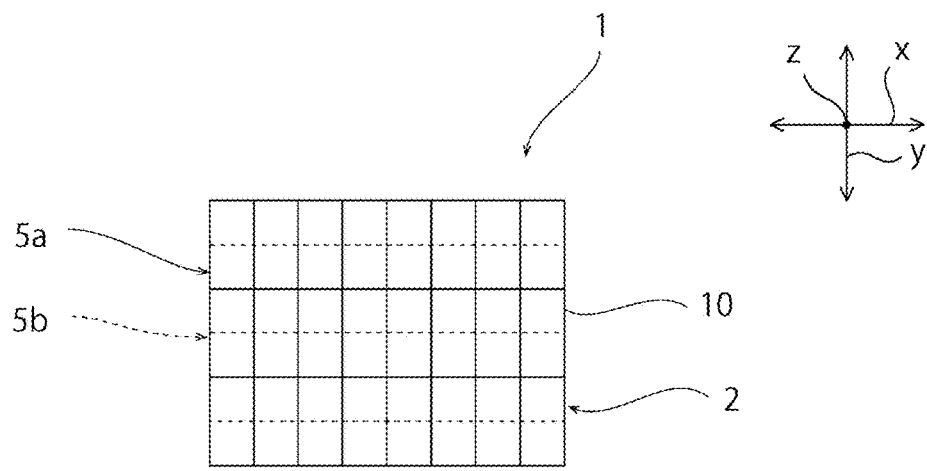
FIG. 2 is a schematic plan view of the all solid storage element laminate as viewed from arrow II in FIG. 1.
Figure 2:
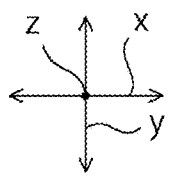

FIG. 1 is a schematic perspective view of an all solid storage element laminate according to a first embodiment. FIG. 2 is a schematic plan view of the all solid storage element laminate as viewed from arrow II in FIG. 1. In FIG. 2, the illustration of a negative electrode 3 is omitted.

As illustrated in FIG. 1, the all solid storage element laminate 1 has an element layer laminate 2 having a rectangular parallelepiped shape, the negative electrode 3 provided on one end surface located on one side in a z-axis direction of the element layer laminate 2, and a positive electrode 4 provided on the other end surface located on the other side in the z-axis direction. The negative electrode 3 and the positive electrode 4 can each be made of, for example, a metal. Nevertheless, in the present invention, the negative electrode 3 and the positive electrode 4 do not necessarily need to be provided.

The element layer laminate 2 includes a plurality of element layers 5. The plurality of element layers 5 are laminated in the z-axis direction (laminating direction).

Each of the plurality of element layers 5 includes a plurality of all solid storage elements 10. As illustrated in FIGS. 1 and 2, in each of the element layers 5, the plurality of all solid storage elements 10 are disposed in a matrix. Specifically, in each of the element layers 5, the plurality of all solid storage elements 10 are disposed in a matrix along an x-axis direction and a y-axis direction perpendicular to the x-axis direction. However, the plurality of all solid storage elements 10 do not necessarily need to be disposed in a matrix along the x-axis direction and the y-axis direction, in each of the element layers 5. The plurality of all solid storage elements may be disposed in a matrix, for example, along a first direction and a second direction inclined with respect to the first direction.

In this embodiment, a description will be given of an example in which the plurality of all solid storage elements 10 constituting the all solid storage element laminate 1 each have a similar shape. However, in the present invention, a plurality of kinds of all solid storage elements may be included in the all solid storage element laminate. Further, the plurality of kinds of all solid storage elements may be included in at least one of a first element layer or a second element layer as described later.

Figure 3:
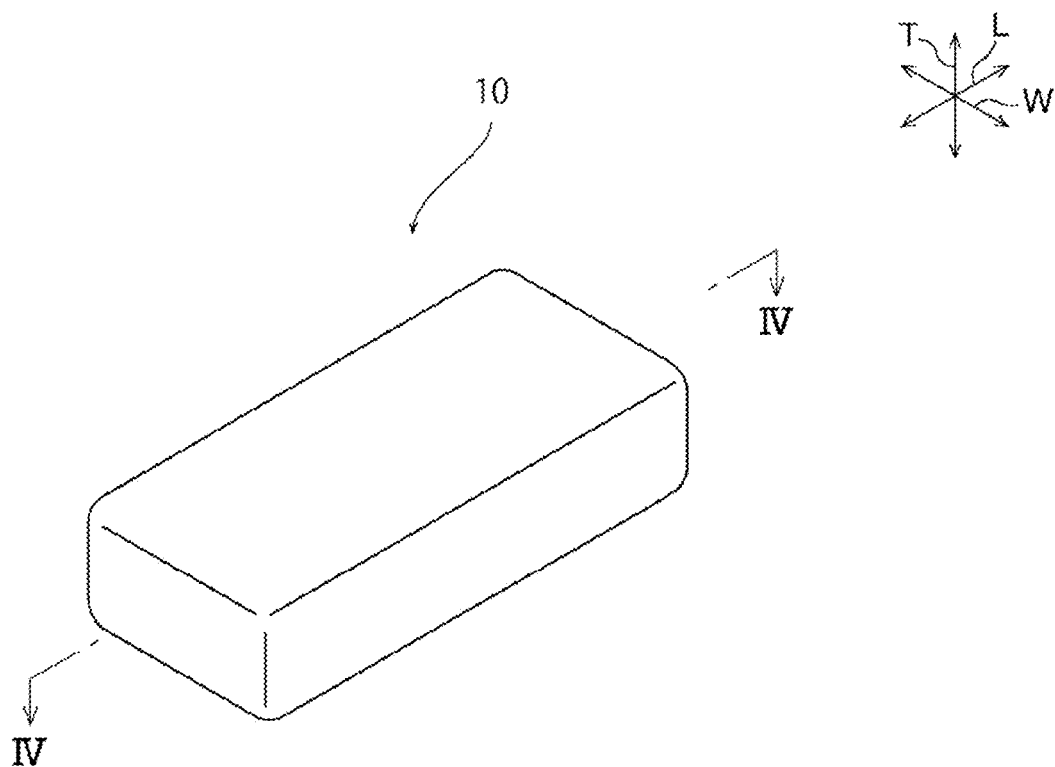
FIG. 3 is a schematic perspective view of an all solid storage element in the first embodiment.
Figure 4:
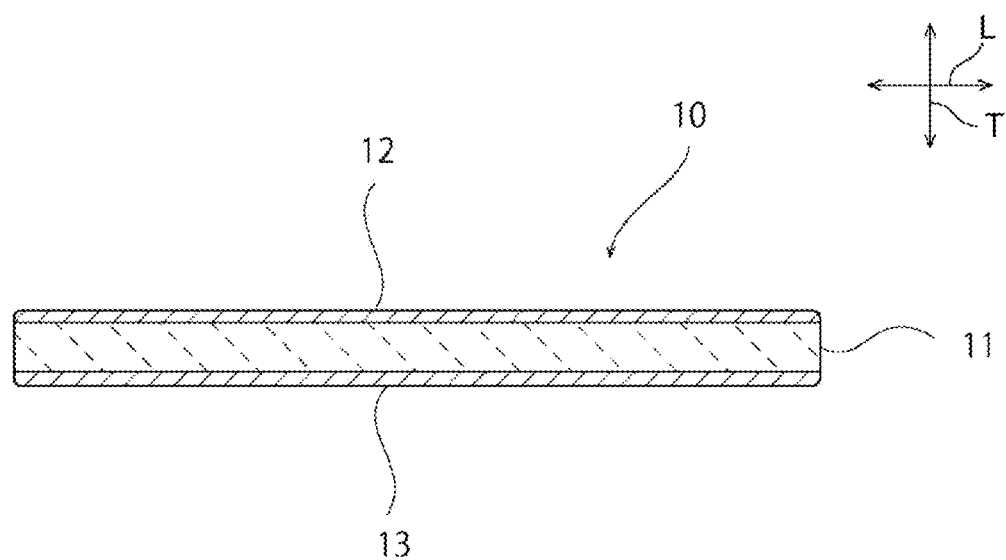
FIG. 4 is a schematic cross-sectional view taken along line IV-IV in FIG. 3.

FIG. 3 is a schematic perspective view of the all solid storage elements 10 in the first embodiment. FIG. 4 is a schematic cross-sectional view taken along line IV-IV in FIG. 3.

As illustrated in FIGS. 3 and 4, the all solid storage element 10 has a rectangular parallelepiped shape. Specifically, in this embodiment, the all solid storage element 10 has a rectangular parallelepiped shape whose dimension in a length direction L is longer than a dimension in a width direction W. The dimension in the length direction L of the all solid storage element 10 is preferably from 1.1 times to 5 times, both inclusive, the dimension in the width direction W, and more preferably from 1.5 times to 3 times, both inclusive. Specifically, in this embodiment, the dimension in the length direction L of the all solid storage element 10 is twice the dimension in the width direction W.

In the present invention, the "rectangular parallelepiped shape" includes a rectangular parallelepiped shape in which at least one of a ridge line portion or a corner portion has a chamfered shape or a rounded shape and a rectangular parallelepiped shape in which at least one of a ridge line portion or a corner portion has a chamfered shape or a rounded shape.

In this embodiment, specifically, the ridge line portion and the corner portion of the all solid storage element 10 have a rounded shape. Thus, in the case where at least one of the ridge line portion or the corner portion of the all solid storage element 10 has a chamfered shape or a rounded shape, when an impact or vibration is applied to the all solid storage element 10 and the adjacent all solid storage elements 10 collide with each other, the all solid storage elements 10 are less likely to be damaged. Therefore, the reliability of the all solid storage element laminate 1 can be improved by using the all solid storage elements 10 in which at least one of the ridge line portion or the corner portion has a chamfered shape or a rounded shape.

The dimensions of the all solid storage element 10 are not particularly limited, and the length of the longest side is preferably 30 mm or less, more preferably 3.2 mm or less, and still more preferably 1 mm or less. In this case, it is possible to suppress breakage of the all solid storage element 10.

The all solid storage element is not particularly limited as long as it is a storage element in which all the constituent elements are solid.

As illustrated in FIG. 4, in this embodiment, the all solid storage element 10 includes a solid electrolyte layer 11, a first electrode 12, and a second electrode 13. The first electrode 12 is disposed on one main surface of the solid electrolyte layer 11, while the second electrode 13 is disposed on the other main surface of the solid electrolyte layer 11. In other words, the solid electrolyte layer 11 is sandwiched between the first electrode 12 and the second electrode 13 which are opposed to each other.

One of the first and second electrodes 12 and 13 constitutes a positive electrode, and the other constitutes a negative electrode. In this embodiment, an example in which the first electrode 12 constitutes a negative electrode and the second electrode 13 constitutes a positive electrode will be described hereinbelow.

The first electrode 12 has a negative electrode current collector and a negative electrode active material layer. The negative electrode current collector is not particularly limited as long as it has electron conductivity. The negative electrode current collector can be made of, for example, carbon, an oxide or composite oxide having high electron conductivity. Specifically, the negative electrode current collector can be made of, for example, Pt, Au, Ag, Al, Cu, stainless steel or indium tin oxide (ITO).

The negative electrode active material layer is provided on the negative electrode current collector. In this embodiment, the negative electrode active material layer is made of a sintered body including negative electrode active material particles, solid electrolyte particles, and conductive particles. Specific examples of the negative electrode active material to be preferably used include a compound represented by the formula $MO_X$ (M is at least one selected from the group consisting of Ti, Si, Sn, Cr, Fe, Nb, V, and Mo. X is 0.9 or more and 3.0 or less), a graphite-lithium compound, a lithium alloy, a lithium-containing phosphate compound having a NaSICON-type structure, a lithium-containing phosphate compound having an olivine-type structure, and a lithium-containing oxide having a spinel-type structure. In the compound represented by $MO_X$, part of oxygen may be substituted by P or Si, or Li may be contained. In other words, a compound represented by $Li_YMO_X$ (M is at least one selected from the group consisting of Ti, Si, Sn, Cr, Fe, Nb, V, and Mo. $0.9 \leq X \leq 3.0$, $2.0 \leq Y \leq 4.0$) can also be suitably used as a negative electrode active material. Specific examples of lithium alloys to be preferably used include Li—Al. Specific examples of the lithium-containing phosphate compound having a NaSICON-type structure to be preferably used include $Li_3V_2(PO_4)_3$. Specific examples of the lithium-containing phosphate compound having an olivine-type structure to be preferably used include $Li_3FePO_4$. Specific examples of the lithium-containing oxide having a spinel-type structure to be preferably used include $Li_4Cu_5O_{12}$. Only one kind of these negative electrode active materials may be used, or a plurality of kinds thereof may be mixed and used.

Specific examples of the solid electrolyte to be preferably used include a lithium-containing phosphate compound having a NaSICON structure, an oxide solid electrolyte having a perovskite structure, and an oxide solid electrolyte having a garnet-type or garnet-like structure. Examples of the lithium-containing phosphate compound having a NaSICON structure which is preferably used include $Li_xM_y(PO_4)_3$ ($0.9 \leq x \leq 1.9$, $1.9 \leq y \leq 2.1$, M is at least one selected from the group consisting of Ti, Ge, Al, Ga, and Zr). Specific examples of the lithium-containing phosphate compound having a NaSICON structure which is preferably used include $Li_{1.4}Al_{0.4}Ge_{1.6}(PO_4)_3$ and $Li_{1.2}Al_{0.2}Ti_{1.8}(PO_4)_3$. Specific examples of the oxide solid electrolyte having a perovskite structure which is preferably used include $La_{0.55}Li_{0.35}TiO_3$. Specific examples of the oxide solid electrolyte having a garnet-type or garnet-like structure which is preferably used include $Li_7La_3Zr_2O_{12}$. Only one kind of these solid electrolytes may be used, or a plurality of kinds thereof may be mixed and used.

Preferably used conductive particles contained in the negative electrode active material layer can be made of, for example, a metal such as Ag, Au, Pt or Pd, carbon, a compound having electron conductivity or a combination thereof. Further, these substances having conductivity may be contained in a state in which surfaces of positive electrode active material particles or the like are covered with the substances.

Note that the negative electrode current collector does not necessarily need to be provided in the first electrode. For example, the first electrode may be made of a negative electrode active material layer.

The second electrode 13 is opposed to the first electrode 12 with the solid electrolyte layer 11 interposed therebetween. The second electrode 13 has a positive electrode current collector and a positive electrode active material layer. The positive electrode active material layer is provided on the positive electrode current collector. The second electrode 13 is disposed such that the positive electrode active material layer is opposed to the negative electrode active material layer. The positive electrode current collector is not particularly limited as long as it has electron conductivity. The positive electrode current collector can be made of, for example, carbon, an oxide or composite oxide having high electron conductivity. The positive electrode current collector can be made of, for example, Pt, Au, Ag, Al, Cu, stainless steel or indium tin oxide (ITO).

The positive electrode active material layer is made of a sintered body including positive electrode active material particles, solid electrolyte particles, and conductive particles. Examples of the positive electrode active material to be preferably used include a lithium-containing phosphate compound having a NaSICON-type structure, a lithium-containing phosphate compound having an olivine-type structure, a lithium-containing layered oxide, and a lithium-containing oxide having a spinel-type structure. Specific examples of the lithium-containing phosphate compound having a NaSICON-type structure to be preferably used include $Li_3V_2(PO_4)_3$. Specific examples of the lithium-containing phosphate compound having an olivine-type structure to be preferably used include $Li_3FePO_4$, $LiMnPO_4$, and $LiCoPO_4$. Specific examples of the lithium-containing layered oxide to be preferably used include $LiCoO_2$ and $LiCo_{1/3}Ni_{1/3}Mn_{1/3}O_2$. Specific examples of the lithium-containing oxide having a spinel-type structure to be preferably used include $LiMn_2O_4$ and $LiNi_{0.5}Mn_{1.5}O_4$. Only one kind of these positive electrode active materials may be used, or a plurality of kinds thereof may be mixed and used.

Examples of materials preferably used as the solid electrolyte contained in the positive electrode active material layer include materials preferably used as the solid electrolyte which are similar to the materials preferably used as the solid electrolyte contained in the negative electrode active material layer.

Specific examples of the conductive particles contained in the positive electrode active material layer include particles which are similar to the particles preferably used as the conductive particles contained in the negative electrode active material layer.

Note that the positive electrode current collector does not necessarily need to be provided in the second electrode. For example, the second electrode may be made of a positive electrode active material layer.

The solid electrolyte layer 11 is disposed between the first electrode 12 and the second electrode 13. In this embodiment, each of the first electrode 12 and the second electrode 13 is directly bonded to the solid electrolyte layer 11. In detail, the first electrode 12, the solid electrolyte layer 11, and the second electrode 13 are integrally sintered. In other words, the all solid storage element 10 is an integral sintered body of the first electrode 12, the all solid electrolyte layer 11, and the second electrode 13.

The solid electrolyte layer 11 is made of a sintered body of solid electrolyte particles. Specific examples of the solid electrolyte to be preferably used include a lithium-containing phosphate compound having a NaSICON structure, an oxide solid electrolyte having a perovskite structure, and an oxide solid electrolyte having a garnet-type or garnet-like structure. Examples of the lithium-containing phosphate compound having a NaSICON structure which is preferably used include $Li_xM_y(PO_4)_3$ ($0.9 \leq x \leq 1.9$, $1.9 \leq y \leq 2.1$, M is at least one selected from the group consisting of Ti, Ge, Al, Ga, and Zr). Specific examples of the lithium-containing phosphate compound having a NaSICON structure which is preferably used include $Li_{1.4}Al_{0.4}Ge_{1.6}(PO_4)_3$ and $Li_{1.2}Al_{0.2}Ti_{1.8}(PO_4)_3$. Specific examples of the oxide solid electrolyte having a perovskite structure which is preferably used include $La_{0.55}Li_{0.35}TiO_3$. Specific examples of the oxide solid electrolyte having a garnet-type or garnet-like structure which is preferably used include $Li_7La_3Zr_2O_{12}$. Only one kind of these solid electrolytes may be used, or a plurality of kinds thereof may be mixed and used.

As illustrated in FIGS. 1 and 2, the plurality of element layers 5 includes two kinds of element layers: a first element layer 5a and a second element layer 5b. In the element layer laminate 2, the first element layer 5a and the second element layer 5b are alternately laminated in the z-axis direction. Thus, the first electrode 12 of one of the all solid storage elements 10 adjacent to each other in the z-axis direction is electrically connected to the second electrode 13 of the other all solid storage element 10. In the element layer laminate 2, the first electrode 12 located closest to one side in the z-axis direction is connected to the negative electrode 3. In the element layer laminate 2, the second electrode 13 located closest to the other side in the z-axis direction is connected to the positive electrode 4.

The orientation of the first element layer 5a is different from the orientation of the second element layer 5b in the length direction L of the all solid storage element 10. Specifically, in the first element layer 5a, the plurality of all solid storage elements 10 is disposed in a matrix such that the length direction L of the all solid storage element 10 is parallel to the y-axis direction. Meanwhile, in the second element layer 5b, the plurality of all solid storage elements 10 is disposed in a matrix such that the length direction L of the all solid storage element 10 is parallel to the x-axis direction perpendicular to the y-axis direction. Thus, all solid storage elements 10 constituting the first element layer 5a which is one element layer of element layers 5a and 5b adjacent to each other in the z-axis direction (a thickness direction T of the all solid storage elements 10) as the laminating direction are electrically connected to the plurality of all solid storage elements 10 constituting the second element layer 5b which is the other element layer. Specifically, in this embodiment, the all solid storage elements 10 constituting the first element layer 5a are connected to two all solid storage elements 10 constituting the second element layer 5b adjacent to the first element layer 5a in the z-axis direction. The all solid storage elements 10 constituting the second element layer 5b are connected to two all solid storage elements 10 constituting the first element layer 5a adjacent to the second element layer 5b in the z-axis direction. Thus, the all solid storage elements 10 adjacent to each other in the z-axis direction as the laminating direction are electrically connected via a plurality of conductive paths. Accordingly, for example, in the case where a crack or the like is generated in the all solid storage elements 10 due to an impact or vibration applied to the all solid storage element laminate 1, and one of the conductive paths between the all solid storage elements 10 adjacent to each other in the z-axis direction is cut, as long as the other of the conductive paths between the all solid storage elements 10 adjacent to each other in the z-axis direction is connected, there is no complete insulation between the all solid storage elements 10. Therefore, it is possible to realize an all solid storage element laminate 1 which has less reduction in capacity and has excellent reliability.

Further, in the all solid storage element laminate 1, the number of all solid storage elements 10 constituting the element layers 5 and the laminated number of the element layers 5 are changed, or the voltage and capacity of the all solid storage elements 10 are changed, so that it is possible to freely change the rated voltage and rated capacity of the all solid storage element laminate 1.

In this embodiment, the example in which two types of element layers 5a and 5b are alternately laminated has been described. However, the present invention is not limited to this configuration. For example, three or more kinds of element layers may be laminated in order. Even in such a case, the above-mentioned effect is exerted as long as all solid storage elements constituting one element layer of the element layers adjacent to each other in the laminating direction (thickness direction of the all solid storage elements) are electrically connected to the plurality of all solid storage elements constituting the other all solid storage element layer.

Figure 5:
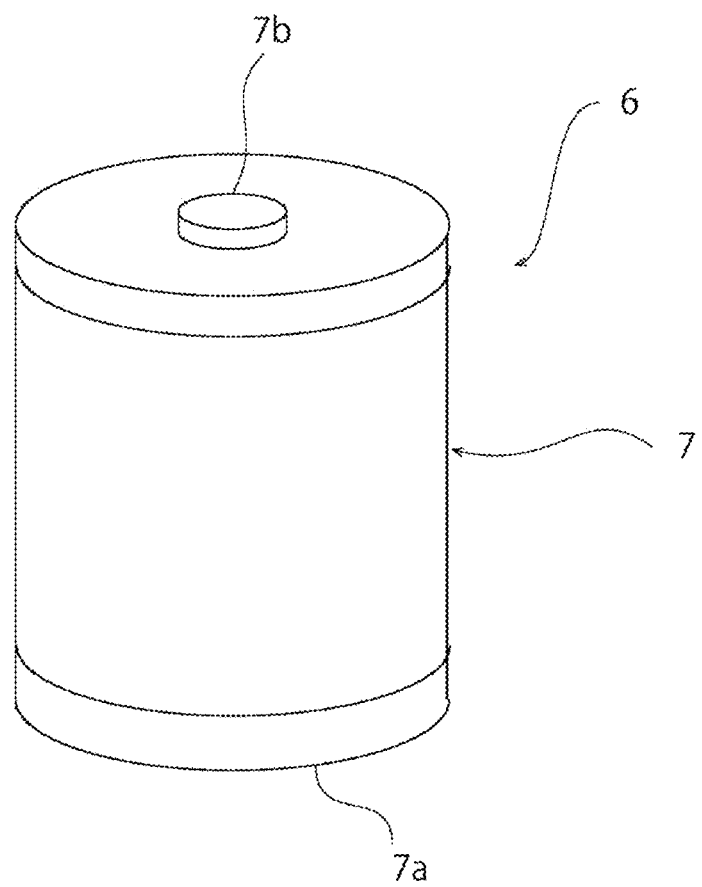
FIG. 5 is a schematic perspective view of a battery in the first embodiment.
Figure 6:
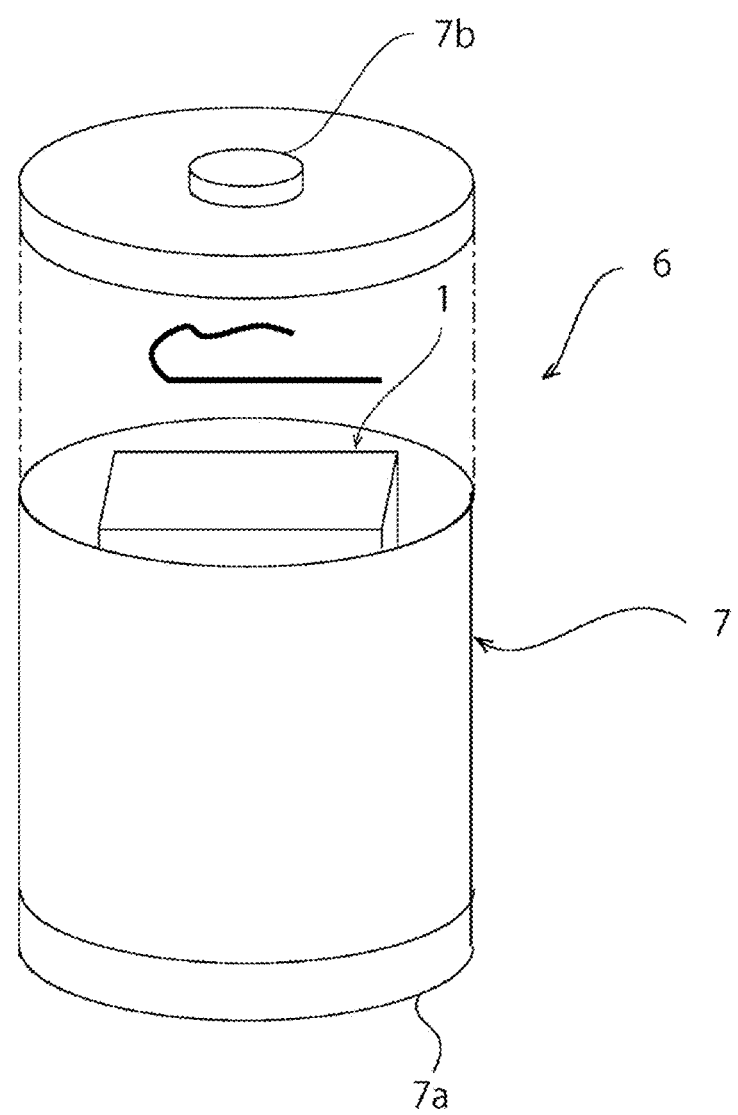
FIG. 6 is a schematic exploded perspective view of the battery in the first embodiment.

FIG. 5 is a schematic perspective view of a battery in the first embodiment. FIG. 6 is a schematic exploded perspective view of the battery in the first embodiment.

Subsequently, a battery 6 produced using the all solid storage element laminate 1 described in this embodiment will be described with reference to FIGS. 5 and 6.

As illustrated in FIG. 6, the battery 6 includes the all solid storage element laminate 1 and an exterior body 7 in which the all solid storage element laminate 1 is housed. The exterior body 7 has a negative electrode terminal 7a electrically connected to the negative electrode 3 (see FIG. 1) and a positive electrode terminal 7b electrically connected to the positive electrode 4 (see FIG. 1).

The inside of the exterior body 7 is filled with a resin. The exterior body 7 and the all solid storage element laminate 1 are fixed by this resin. Accordingly, for example, even if an impact or vibration is applied to the battery 6, the all solid storage element laminate 1 is suppressed from being damaged due to collision of the exterior body 7 with the all solid storage element laminate 1.

As described above, the all solid storage element laminate 1 has excellent reliability. Accordingly, the battery 6 also has less reduction in capacity and has excellent reliability even when an impact or vibration is applied.

In this embodiment, the example in which the exterior body 7 has a cylindrical shape and whose both ends are closed has been described. However, in the present invention, the exterior body 7 is not limited to this shape. For example, the exterior body 7 may have a rectangular parallelepiped shape. That is, the battery according to the present invention may be a cylindrical battery, a button-shaped battery, a rectangular parallelepiped-shaped battery or the like.

The battery according to the present invention may be a primary battery or a secondary battery.

Hereinafter, other examples of preferred embodiments of the present invention will be described. In the following description, members having substantially the same functions as those of the first embodiment are referred to by the same reference numerals, and the description thereof is omitted.

Second Embodiment

Figure 7:
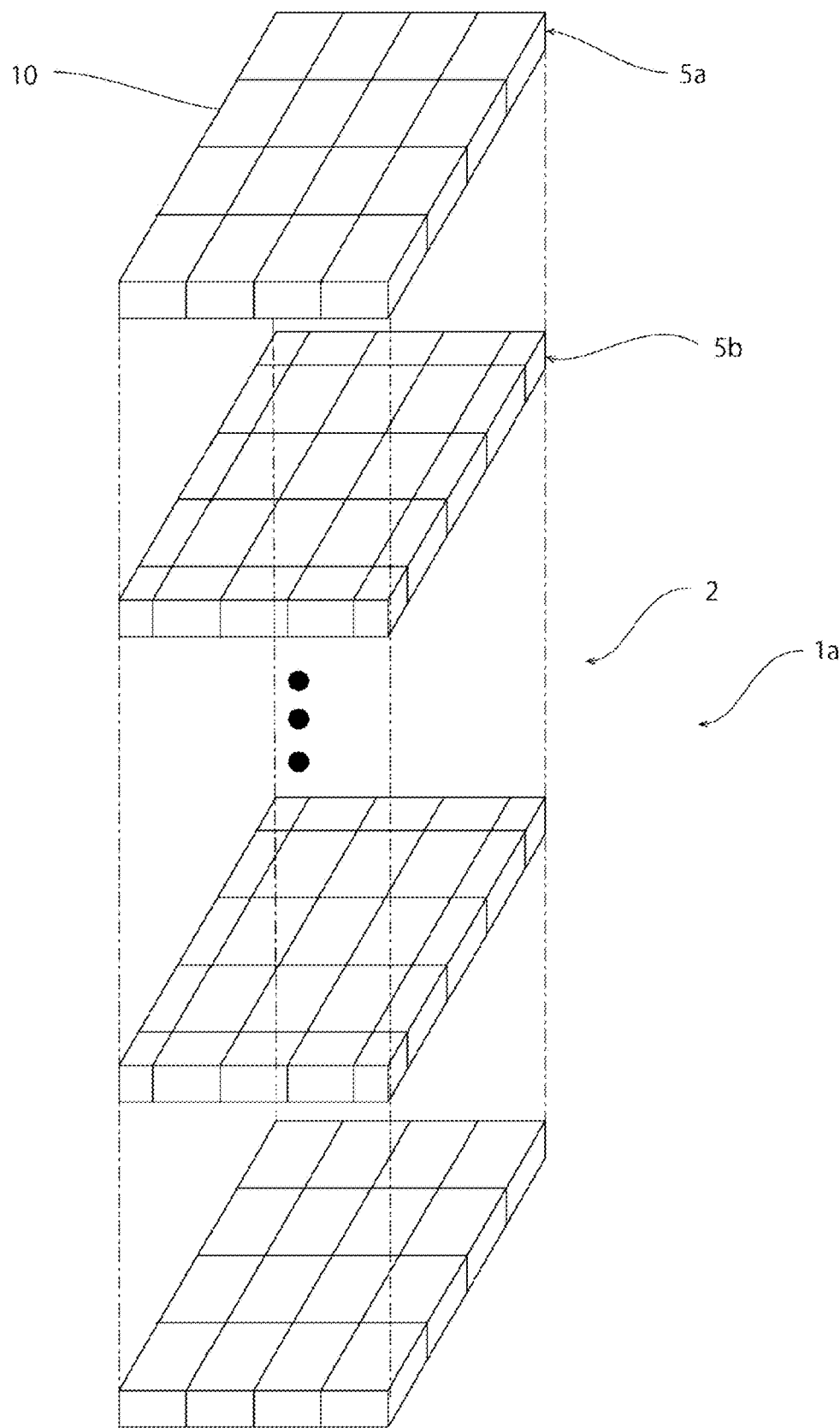
FIG. 7 is a schematic exploded perspective view of a main portion of an all solid storage element laminate according to a second embodiment.
Figure 8:
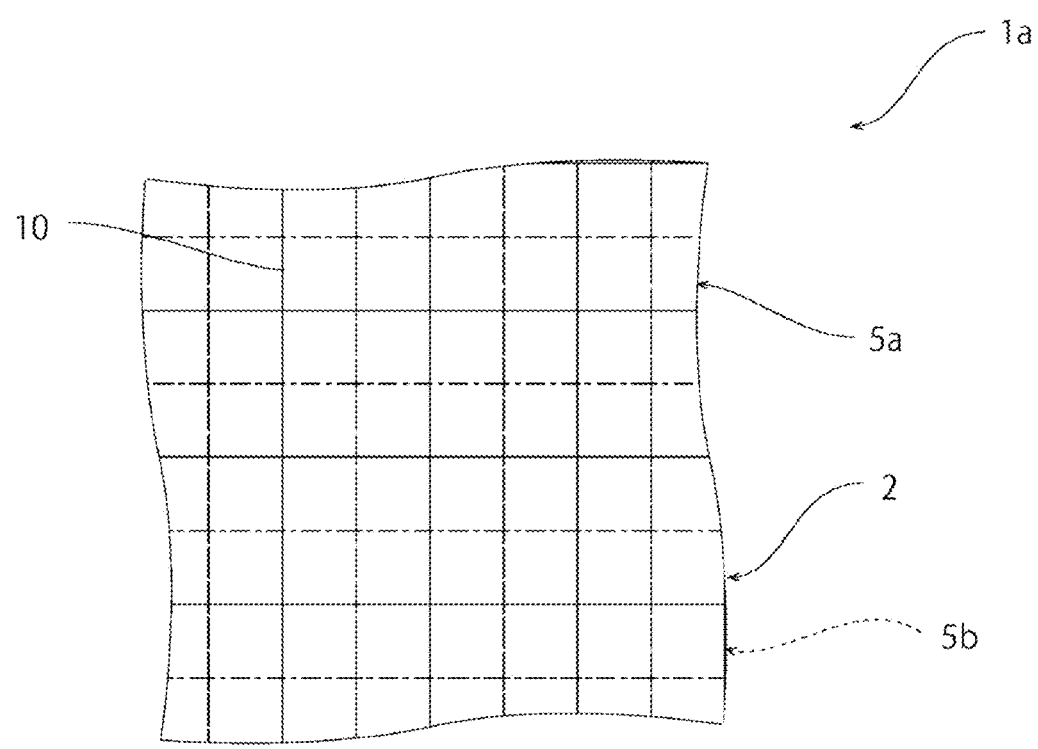
FIG. 8 is a schematic plan view of the all solid storage element laminate according to the second embodiment.

FIG. 7 is a schematic exploded perspective view of a main portion of an all solid storage element laminate 1a according to a second embodiment. FIG. 8 is a schematic plan view of the all solid storage element laminate 1a according to the second embodiment. In FIG. 8, the illustrations of the negative electrode 3 and the positive electrode 4 are omitted.

In the first embodiment, the example has been described in which the first element layer 5a and the second element layer 5b are constituted by similar rectangular parallelepiped-shaped all solid storage elements 10, and the length direction L of the all solid storage elements 10 constituting the first element layer 5a is perpendicular to the length direction L of the all solid storage elements 10 constituting the second element layer 5b. However, the present invention is not limited to this configuration. In the present invention, the length directions L of the all solid storage elements constituting element layers adjacent to each other in the thickness direction of the all solid storage elements may be parallel to each other.

For example, as illustrated in FIGS. 7 and 8, in the all solid storage element laminate 1a according to the second embodiment, the length directions L of the all solid storage elements 10 are parallel to each other in both the first element layer 5a and the second element layer 5b. In a planar view, the position of the all solid storage elements 10 constituting the first element layer 5a and the position of the all solid storage elements 10 constituting the second element layer 5b are different from each other. When viewed in a planar view, the plurality of all solid storage elements 10 are disposed such that the all solid storage elements 10 constituting the first element layers 5a adjacent to each other in the z-axis direction (the thickness direction of the all solid storage elements 10) as the laminating direction are overlapped with four all solid storage elements 10 constituting the second element layer 5b and adjacent to one another at corner portions, and the all solid storage elements 10 constituting the second element layer 5b are overlapped with four all solid storage elements 10 constituting the first element layer 5a and adjacent to one another at corner portions. In other words, in a planar view, the first and second element layers 5a and 5b are provided such that the corner portions of the four all solid storage elements constituting the first element layer 5a and being adjacent to one another at corner portions are located in the all solid storage elements 10 constituting the second element layer 5b, and the corner portions of the four all solid storage elements constituting the second element layer 5b and being adjacent to one another at corner portions are located in the all solid storage elements 10 constituting the first element layer 5a. Thus, the all solid storage elements 10 constituting the first element layer 5a are connected to the four all solid storage elements 10 constituting the second element layer 5b. The all solid storage elements 10 constituting the second element layer 5b are connected to the four all solid storage elements 10 constituting the first element layer 5a. Thus, the all solid storage element laminate 1a according to the second embodiment has more conductive paths than the all solid storage element laminate 1 according to the first embodiment. Therefore, the all solid storage element laminate 1a has more excellent reliability.

Third Embodiment

Figure 9:
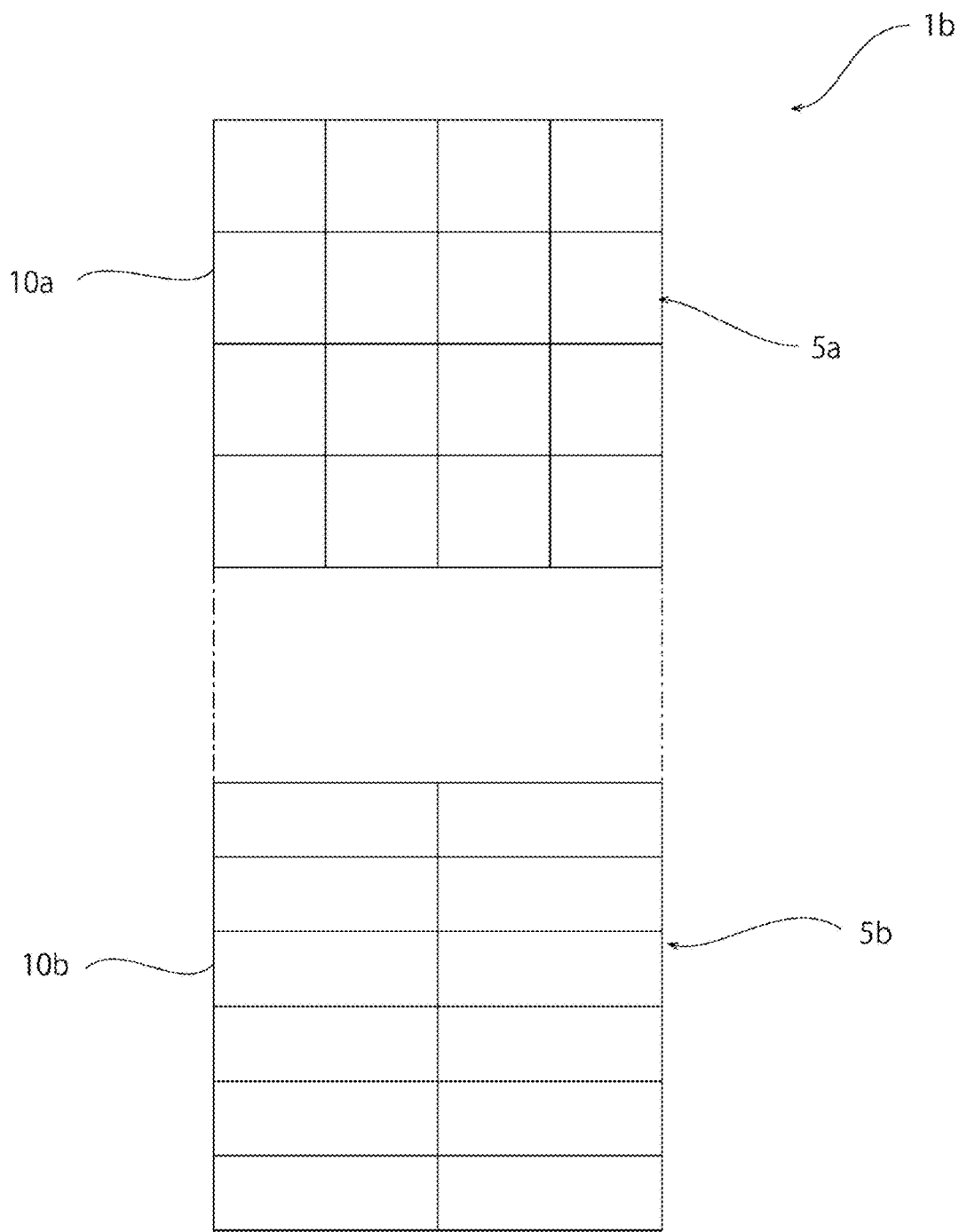
FIG. 9 is a schematic plan view for describing a first element layer and a second element layer of an all solid storage element laminate in a third embodiment.

FIG. 9 is a schematic plan view for describing a first element layer 5a and a second element layer 5b of an all solid storage element laminate 1b according to a third embodiment.

As illustrated in FIG. 9, the shapes of the all solid storage elements 10a constituting the first element layer 5a are different from the shapes of the all solid storage elements 10b constituting the second element layer 5b. Thus, the all solid storage elements 10a constituting the first element layer 5a may be electrically connected to a plurality of all solid storage elements 10b constituting the second element layer 5b. Specifically, in the third embodiment, a planar view shape of each of the all solid storage elements 10a is square. The planar view shape of each of the all solid storage elements 10b is rectangular.

Fourth, Fifth, and Sixth Embodiments

Figure 10:
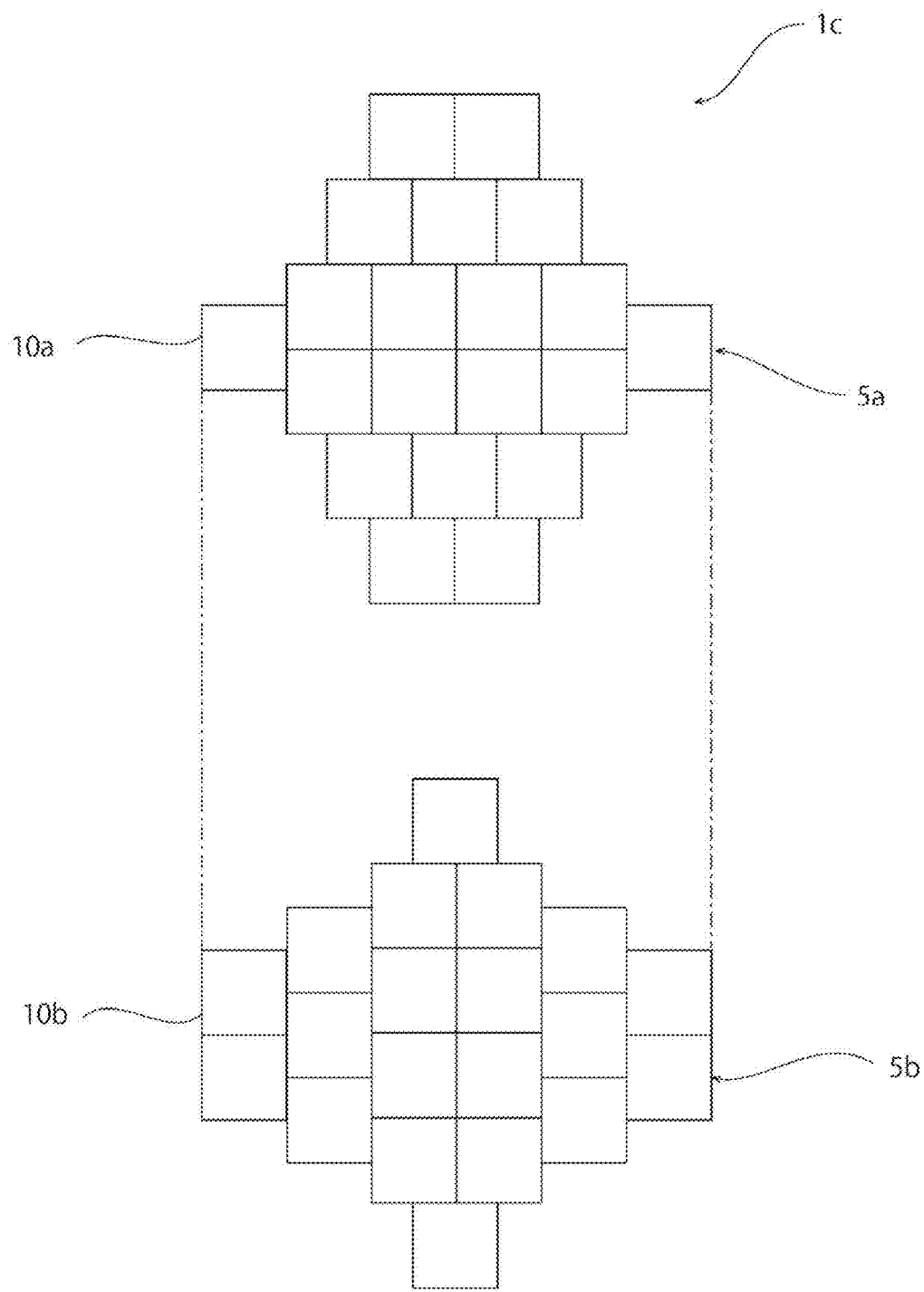
FIG. 10 is a schematic plan view for describing a first element layer and a second element layer of an all solid storage element laminate in a fourth embodiment.
Figure 11:
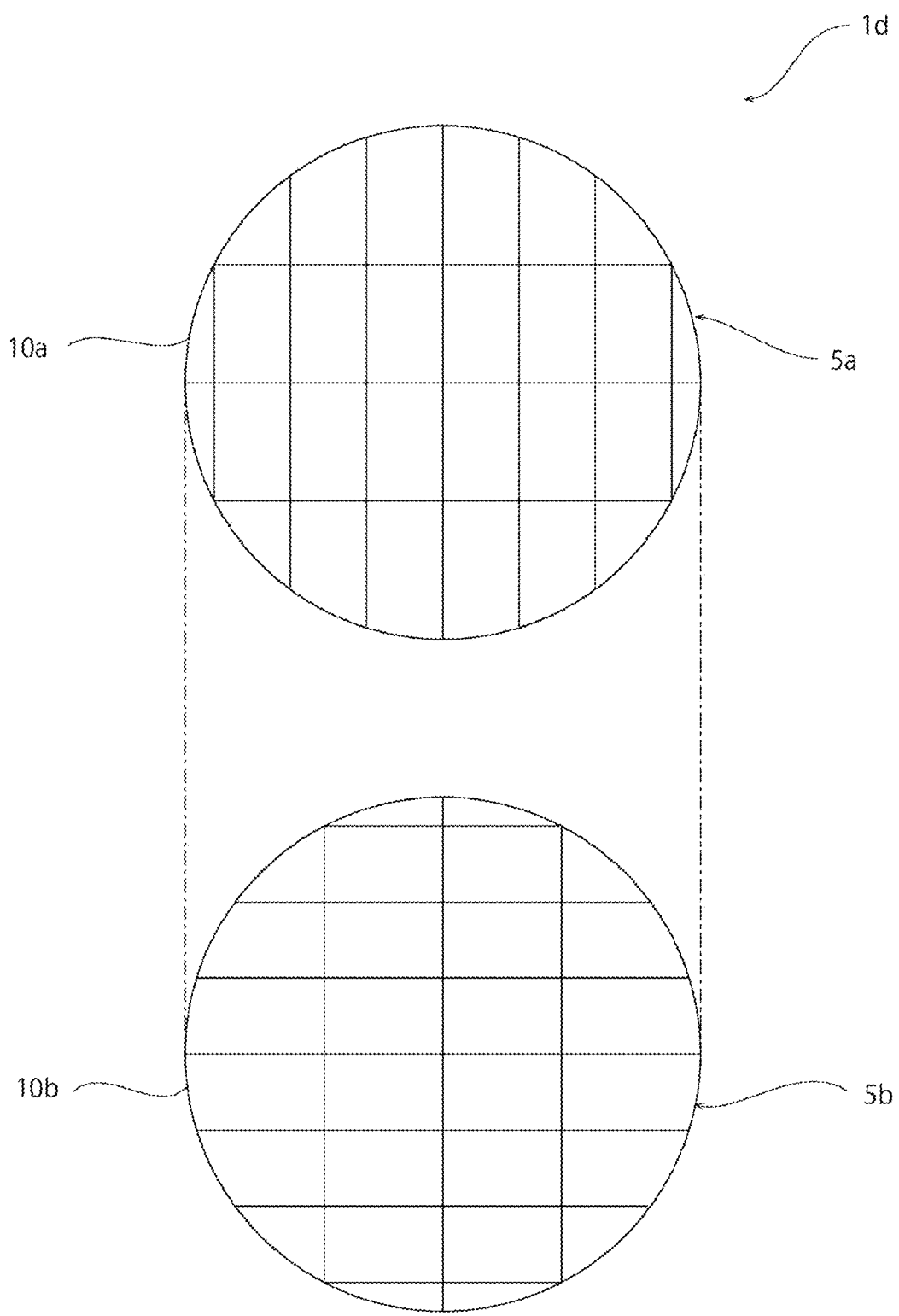
FIG. 11 is a schematic plan view for describing a first element layer and a second element layer of an all solid storage element laminate in a fifth embodiment.
Figure 12:
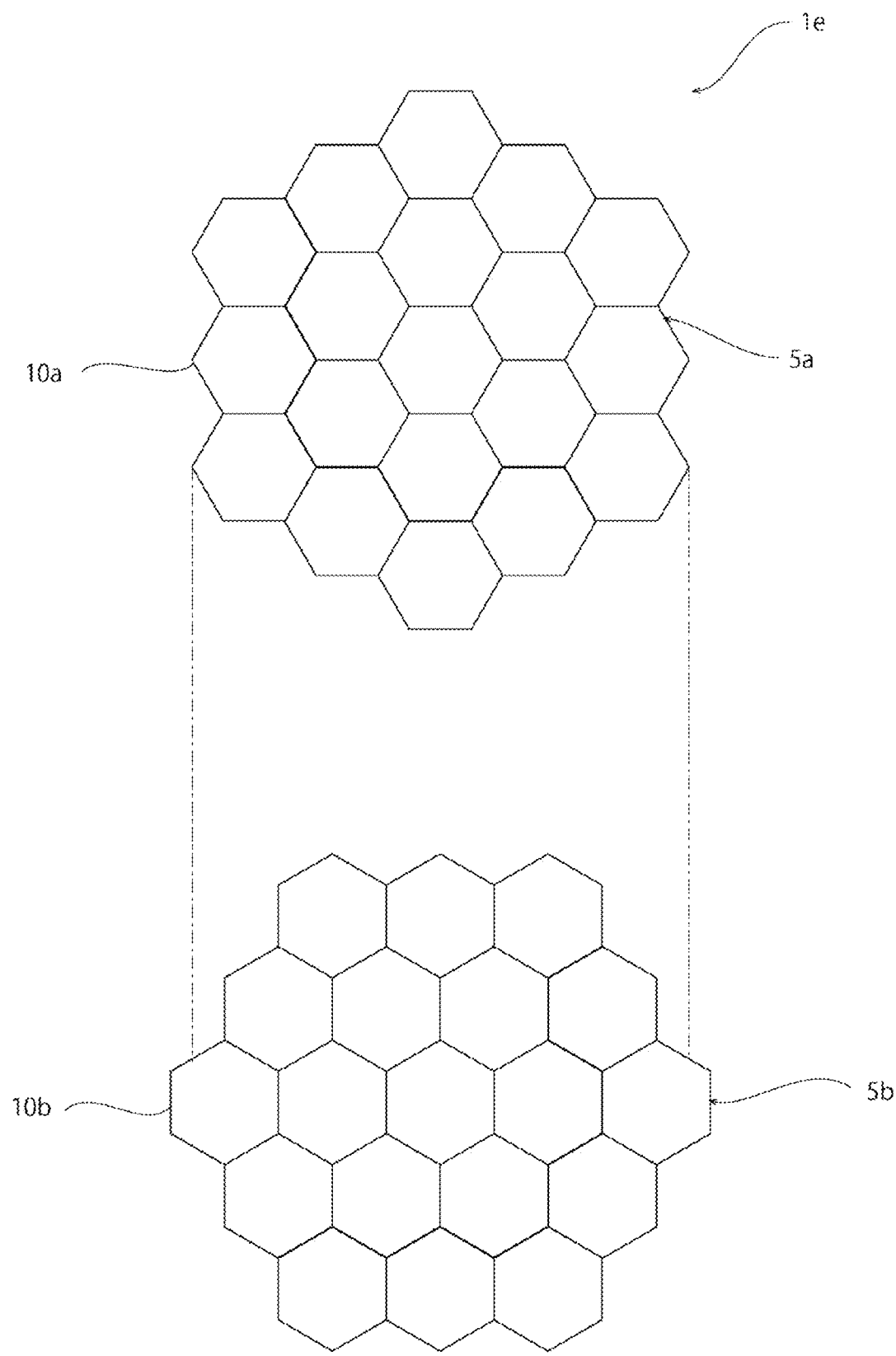
FIG. 12 is a schematic plan view for describing a first element layer and a second element layer of an all solid storage element laminate in a sixth embodiment.

FIG. 10 is a schematic plan view for describing a first element layer 5a and a second element layer 5b of an all solid storage element laminate 1c according to a fourth embodiment. FIG. 11 is a schematic plan view for describing a first element layer 5a and a second element layer 5b of an all solid storage element laminate 1d according to a fifth embodiment. FIG. 12 is a schematic plan view for describing a first element layer 5a and a second element layer 5b of an all solid storage element laminate 1e according to a sixth embodiment.

In the first to third embodiments, the example in which the all solid storage element laminate has a prismatic shape (rectangular parallelepiped shape) has been described. However, in the present invention, the shape of the all solid storage element laminate is not particularly limited. For example, as illustrated in FIGS. 10 to 12, the all solid storage element laminates 1c, 1d, and 1e do not necessarily have a prismatic shape. The shapes of the all solid storage element laminates can be appropriately determined according to, for example, the shape of the exterior body 7 which houses the all solid storage element laminate.

Further, in the first to fourth embodiments, the example in which each of the all solid storage elements has a rectangular parallelepiped shape has been described. However, in the present invention, the shape of each of the all solid storage elements is not particularly limited. For example, as illustrated in FIG. 11, some of the all solid storage elements may have a rectangular parallelepiped shape, and the remaining all solid storage elements do not necessarily have a rectangular parallelepiped shape. Further, for example, as illustrated in FIG. 12, a planar view shape of each of the all solid storage elements may be polygonal.

In the first to third embodiments, the example has been described in which all the all solid storage elements 10 constituting the first element layer 5a are connected to the plurality of all solid storage elements 10 constituting the second element layer 5b, and all the all solid storage elements 10 constituting the second element layer 5b are connected to the plurality of all solid storage elements 10 constituting the first element layer 5a. However, the present invention is not limited to this configuration.

The present invention may include an all solid storage element in which one element layer of element layers adjacent to each other in a thickness direction of all solid storage elements is connected to only one of all solid storage elements constituting the other element layer. For example, in the all solid storage element laminate 1 illustrated in FIG. 10, each of the four central all solid storage elements among the all solid storage elements 10a constituting the first element layer 5a is connected to only one of the four central all solid storage elements among the all solid storage elements 10b constituting the second element layer 5b. Even in this case, the effect of improving the reliability of the all solid storage element laminate is exerted.

DESCRIPTION OF REFERENCE SYMBOLS 1, 1a, 1b, 1c, 1d, 1e: All solid storage element laminate
2: Element layer laminate
3: Negative electrode
4: Positive electrode 5, 5a, 5b: Element layer
6: Battery
7: Exterior body
7a: Negative electrode terminal
7b: Positive electrode terminal
10, 10a, 10b: All solid storage element
11: Solid electrolyte layer
12: First electrode
13: Second electrode

The invention claimed is:

1. An all solid storage element laminate comprising:
a plurality of element layers laminated in a thickness direction, each element layer of the plurality of element layers having a plurality of all solid storage elements disposed in a matrix such that a first plurality of all solid storage elements of a first element layer of the plurality of element layers are electrically connected to a second plurality of all solid storage elements of a second element layer of the plurality of element layers, the first element layer and the second element layer being adjacent to each other in the thickness direction,
wherein each of the plurality of all solid storage elements of each element layer of the plurality of element layers has a rectangular parallelepiped shape having opposed long sides and opposed short sides shorter in length than the opposed long sides, wherein the first plurality of all solid storage elements of the first element layer are disposed such that the opposed long sides thereof extend along a first longitudinal direction, and the second plurality of all solid storage elements of the second element layer are disposed such that the opposed long sides thereof extend along a second longitudinal direction different from the first longitudinal direction.

2. The all solid storage element laminate according to claim 1, wherein at least one of a ridge line portion and a corner portion each of the plurality of all solid storage elements of each element layer of the plurality of element layers has a chamfered shape or a rounded shape.

3. The all solid storage element laminate according to claim 1, wherein the opposed long sides of each of the plurality of all solid storage elements of each element layer of the plurality of element layers is 1 mm or less.

4. The all solid storage element laminate according to claim 1, wherein four of the first plurality of all solid storage elements of the first element layer overlap with four of the second all solid storage elements of the second element layer and adjacent to each another at corner portions thereof.

5. The all solid storage element laminate according to claim 1, wherein a planar view shape of each of the plurality of the all solid storage elements is polygonal.

6. The all solid storage element laminate according to claim 1, wherein each of the plurality of all solid storage elements includes a solid electrolyte layer, a first electrode on a first main surface of the solid electrolyte layer, and a second electrode on a second main surface of the solid electrolyte layer opposite the first main surface.

7. The all solid storage element laminate according to claim 1, wherein the first electrode is a negative electrode and the second electrode is a positive electrode.

8. The all solid storage element laminate according to claim 1, wherein the first element layer is electrically connected to the second element layer in the thickness direction via a plurality of conductive paths.

9. The all solid storage element laminate according to claim 1, wherein the first element layer has a different number of all solid storage elements than the second element layer.

10. The all solid storage element laminate according to claim 1, wherein a position of the first plurality of all solid storage elements of the first element layer in a planar view of the all solid storage element laminate is different from that of the second plurality of all solid storage elements of the second element layer.

11. The all solid storage element laminate according to claim 1, wherein a shape of the first plurality of all solid storage elements of the first element layer is different from a shape of the second plurality of all solid storage elements of the second element layer.

12. The all solid storage element laminate according to claim 1, wherein a shape of first set of storage elements of the first plurality of all solid storage elements is different from a shape of a second set of storage elements of the first plurality of all solid storage elements.

13. The all solid storage element laminate according to claim 12, wherein a shape of third set of storage elements of the second plurality of all solid storage elements is different from a shape of a fourth set of storage elements of the second plurality of all solid storage elements.

14. A battery comprising:
the all solid storage element laminate according to claim 1; and
an exterior body housing the all solid storage elements.

15. The battery according to claim 14, further comprising a resin filling an inside of the exterior body.

* * * * *